(12) United States Patent
Gmeiner

(10) Patent No.: US 6,402,362 B1
(45) Date of Patent: Jun. 11, 2002

(54) DEVICE FOR PRODUCING A FLOWABLE MASS

(75) Inventor: Paul Gmeiner, Oberwil-Lieli (CH)

(73) Assignee: Micafil AG, Zurich (CH)

( * ) Notice: Subject to any disclaimer, the term of this patent is extended or adjusted under 35 U.S.C. 154(b) by 0 days.

(21) Appl. No.: 09/562,096

(22) Filed: May 1, 2000

(30) Foreign Application Priority Data

Apr. 29, 1999 (DE) .......................................... 199 19 519

(51) Int. Cl.$^7$ ................................................ B01F 13/00
(52) U.S. Cl. .................................... 366/139; 366/155.1
(58) Field of Search ................................ 366/139, 144, 366/147, 154.1, 155.1, 292

(56) References Cited

U.S. PATENT DOCUMENTS

| | | | |
|---|---|---|---|
| 1,933,346 A | * | 10/1933 | Schwentker |
| 4,469,444 A | * | 9/1984 | Gmeiner et al. |
| 5,249,861 A | | 10/1993 | Thomson |
| 5,833,363 A | * | 11/1998 | Gmeiner |

FOREIGN PATENT DOCUMENTS

| | | |
|---|---|---|
| DE | 1 507 889 | 2/1970 |
| DE | 24 50 768 | 5/1976 |
| DE | 34 05 092 | 8/1984 |
| DE | 40 02 527 | 8/1990 |
| DE | 196 25 208 | 1/1998 |
| EP | 0 678 328 | 10/1995 |
| FR | 2 353 330 | 12/1997 |
| GB | 1 251 044 | 10/1971 |

* cited by examiner

Primary Examiner—Charles E. Cooley
Assistant Examiner—David Sorkin
(74) Attorney, Agent, or Firm—Burns, Doane, Swecker & Mathis, L.L.P.

(57) ABSTRACT

The device is intended for the production of a flowable mass (5), in particular a filler-containing casting resin, from starting components. It is provided with a container (1, 4) holding the mass while forming a fluid level (10, 75), where agitation elements (8, 17, 18, 21) are arranged below the fluid level in said container. A pass-through mixer (70) is located in an inlet (7) of the container (1). The pass-through mixer (70) comprises a premixing containing (71) provided with mixing elements (721, 722, 723) and is used to mix the starting components. The premixing container (71) is provided below the level (10, 75) of the flowable mass with one each inlet (73) and outlet opening (74) for the flowable mass (5). Because of the combined action of a free jet generated by the pass-through mixer (70) at the outlet opening (74) and the agitation elements (8) provided in the container, a flowable mass that is particularly well mixed and—if desired—is also intensively degassed can be produced in a space- and energy-saving manner. In addition, no expensive differential scales are required.

10 Claims, 1 Drawing Sheet

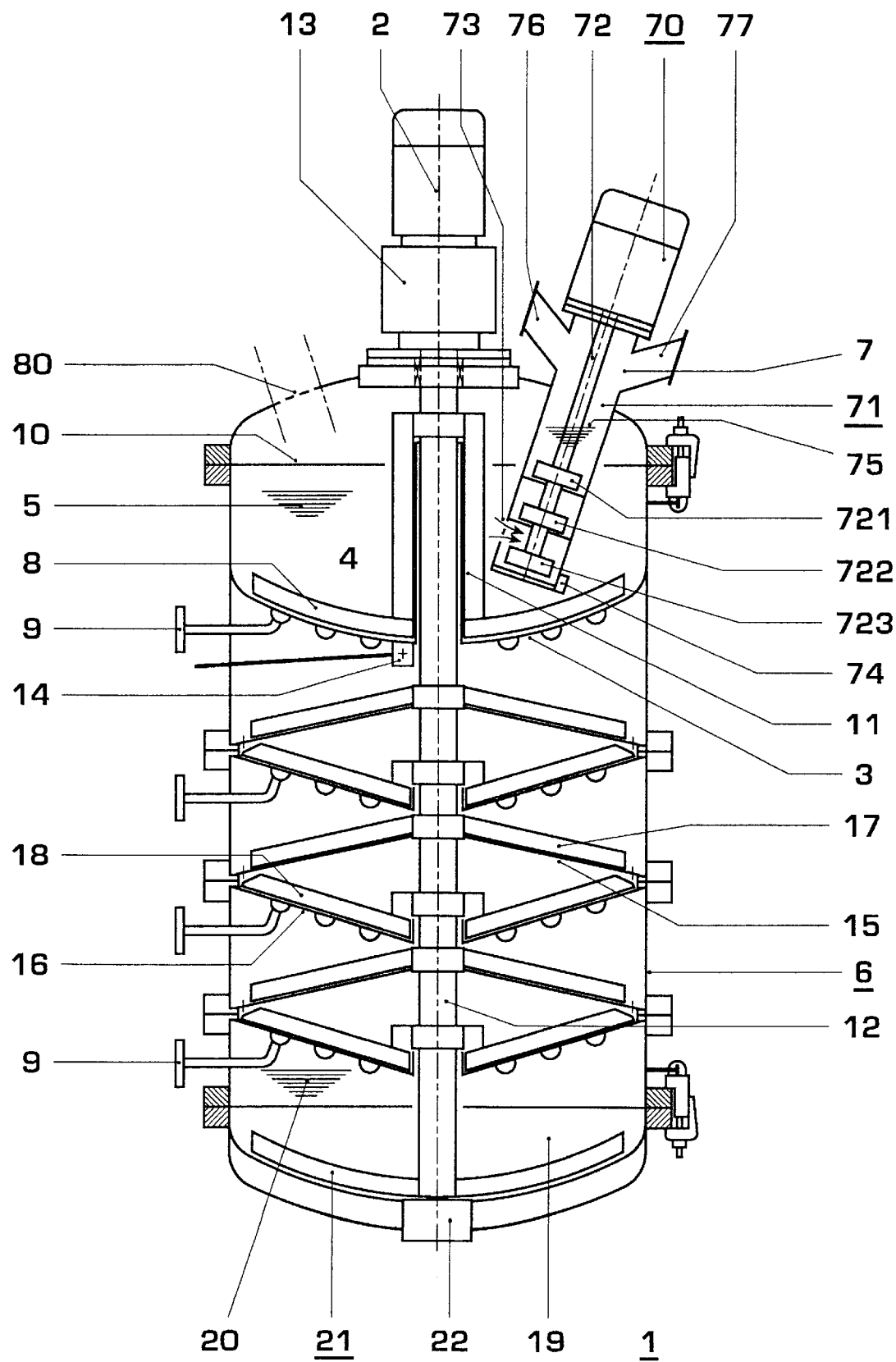

DEVICE FOR PRODUCING A FLOWABLE MASS

FIELD OF THE INVENTION

This invention relates to apparatus for producing a flowable mass, and more particularly to apparatus for producing a flowable filler containing casting resin.

BACKGROUND OF THE INVENTION

A device of the mentioned type is described in U.S. Pat. No. 5,833,363. This device is provided with a cylindrically constructed, evacuatable container, the container axis of which is oriented essentially in vertical direction. A shaft extending along the container axis has agitation arms and a distribution plate. A flowable, gas-containing mass, for example a filler-containing casting resin, is guided inside this device under the force of gravity and under agitation from a storage space on the top by way of a thin layer degassing system that removes the gas from the flowable mass into a buffer space provided at the bottom of the container. In this buffer space, the degassed mass that has been homogenized by agitation is temporarily stored under agitation prior to further processing. The flowable mass to be homogenized and degassed that is fed into this device first must be produced in a premixer from prepared starting components. In order to obtain an evenly mixed, flowable mass, a pass-through mixing device that is used together with differential scales is usually required for relatively reactive mixtures, since only this ensures a brief staying time of the mixture. Such a device is relatively complex.

SUMMARY OF THE INVENTION

The object of this invention is to provide a device of the initially mentioned type that can be used to produce a flowable mass from given starting components with high mixing quality in a simple manner. Such a device is used primarily for producing and processing a flowable mass just before the mass is poured into molds inside a casting apparatus. The mass is mixed from starting components and may also be effectively degassed inside this device. The starting components, for example, a filler and a resin or hardener, are hereby first processed, the filler preferably by hot air fluidization, the resin or hardener by heating, and are then mixed in a mixing device to form a flowable mass. In a following mixing and degassing device, the flowable mass is homogenized by constant agitation, preferably under a vacuum.

In a device according to the invention, the inlet of a container of this device that holds a flowable mass and contains agitation elements is provided with a pass-through mixer in which the starting components are premixed during a first stage, and the premix produced in this way is then mixed during a second stage with flowable mass from the container. The mass produced in this manner in the pass-through mixer then enters the flowable mass in the container in the form of a free jet from the pass-through mixer. As a result of this and because of the simultaneous agitation of the mass inside the container, an intensive circulation of the mass, i.e., a homogeneous mixing and good pre-degassing of the flowable mass, is achieved in a short amount of time. This good mixing is further improved in a space- and energy-saving manner by the combined effect of the free jet and the agitation elements provided in the container. Since the container is able to hold a large volume of flowable mass, it is sufficient if the latter is metered into the container via the pass-through mixer that is operated practically as a parallel arrangement. The starting materials are hereby weighed in batches, and the batches are fed without differential scales via the pass-through mixer directly into the container. By metering the starting components into the pass-through mixer that operates in a graduated manner, sedimentation of solid particles is largely prevented at the same time.

If the container of the mixing device is provided with an upper partial container for holding the flowable mass, a degassing system may be provided additionally in the container below this partial container in order to degas and further homogenize the flowable mass. This means that the flowable mass not only can be mixed from the starting components in the mixing device, but this mass can be degassed and homogenized and possibly also stored at the same time.

BRIEF DESCRIPTION OF THE DRAWINGS

These and other advantages of the invention are explained in more detail below in reference to the drawing which is a side elevational view of the device for producing a flowable mass in accordance with this invention.

DETAILED DESCRIPTION OF THE INVENTION

The device shown in FIG. 1 is provided with a cylindrically constructed, evacuatable container 1, the container axis 2 of which is oriented essentially in vertical direction. This container is divided by a dividing wall 3 into a partial container or chamber 4 for the flowable mass 5 to be degassed, such as, for example, a mix of two filler-free and filler-containing fluids, for example a filler-containing, reactive casting resin mass, and a pass-through container 6 for processing this mass by degassing and mixing. The mass 5 is brought via a pass-through mixer 70 in inlet 7 into the partial container 4. With the help of agitation elements 8, each of which is constructed as an arm, the mass brought into the partial container 4 is mixed through and is heated and cooled with the help of a heating and cooling device 9. For this purpose, two, three, or even more heating, or heating and cooling, coils are coaxially arranged with axially spaced apart pipe windings directly below the dividing wall 3. These coils are supplied with energy by a heat generator (not numbered). A pipe section 11 is formed, possibly in a fluid-and/or gas-tight manner, into the dividing wall 3 that acts as the bottom of the partial container 4, said pipe section extending along the container axis 2 into the partial container 4 and ending above the level 10 of the mass 5 to be degassed. The pipe section 11 can be constructed as a bearing of a shaft 12 extending on the container axis 2, said shaft being passed from the outside into the container 1 and driven by a drive 13 located on a cover of the container 1 and in this way being easily accessible. The part of the bottom 3 of the partial container 4 arranged between the wall of the container 1 and the pipe section 11 is constructed so as to deepen from the outside towards the inside and has at a deepest point that adjoins the pipe section 11 a controllable opening 14 for withdrawing mass 5 to be degassed. The agitating elements 8 are attached directly to the shaft 12 and extend close to the bottom 3 and outside wall of the partial container 4, ensuring in this way a good mixing of the flowable mass 5 to be degassed and at the same time preventing its sedimentation.

In the container 1 is fixed a thin layer degassing system of funnel-shaped metal sheets. Adjoining metal sheets are angled in opposite directions and arranged so as to be offset relative to each other in the direction of the container axis 2. Each of them has a conically constructed run-off surface, for example 15 or 16. Starting from the shaft 12, the run-off surface 15 is tilted conically outward in such a way that the mass to be degassed is guided under the influence of the force of gravity outward to the wall of container 1. Slots (not visible in the drawing) are formed into the outside edge of the associated metal sheet. Before reaching the wall, the mass flowing towards the wall is passed through these slits onto the metal sheet located under it. The run-off surface 16 of this metal sheet is angled in opposite direction to the run-off surface 15, i.e. from outside to inside. The mass supplied through the slits from the metal sheet above is therefore guided on the support surface 16 from the outside to the inside and is guided along the inside edge or via slits formed in the area of the inside edge into the associated metal sheet to the metal sheet below it (not numbered). This metal sheet and three additional metal sheets below it which have not been numbered for reason of clarity are constructed like the two previously described metal sheets. According to the dividing wall 3, several of the metal sheets, for example the metal sheet forming the run-off surface 16, can be heated or cooled.

Strip-off elements constructed as individual agitating arms are attached to the shaft 12; for reasons of clarity, only run-off elements 17 or 18 have been numbered. These strip-off elements each are arranged just above one of the run-off surfaces, for example 15 or 16 respectively.

The pass-through container 6 is followed in downward direction by a buffer space 19 in which the mass 20 that was degassed in the pass-through container 6 is stored.

At a free end of the shaft 12 inside the buffer space 19, agitating elements 21 are attached that are constructed as individual arms and extend into the bottom area of the buffer space and ensure a good mixing of the degassed mass 20. A pipe piece 22 extending axially symmetrically from the container 1 is arranged for discharging the degassed and mixed mass 20.

The pass-through mixer 70 is provided with a premixing container 71 extending in general in a gas-tight manner through the wall of the container 1 and constructed preferably as a gas-tight pipe, said premixing container having on its end outside the container 1 a drive (not numbered for reasons of clarity) for a drive shaft 72 that carries mixing elements 721, 722, and 723.

The premixing container 71 has below the level 10 of the flowable mass at least one each inlet 73 and one outlet opening 74 for the flowable mass. When the drive shaft 72 is rotating, the inlet opening 73 is located in the vacuum part of the mixing element 723. The premixing container 71 is provided outside of the container 1 and above a level 75 of flowable mass that occurs inside it during operation with two fill pipes 76, 77 at its pipe wall for adding the starting components making up the flowable mass. The two mixing elements 721 and 722 are arranged between the fill pipes 76, 77 and the inlet opening 73. Offset to this in the direction of the drive shaft 72, mixing element 723 is arranged between the inlet opening 73 and the outlet opening 74. Deflection elements constructed in the manner of a wall equipped with through-holes (not shown in the drawing for reasons of clarity) are arranged between the individual mixing elements.

The function of this mixing and degassing device is as follows:

Metered amounts, defined by weighing, of a batch of starting components for the flowable mass to be produced (for a casting resin as a flowable mass, for example, this may be a filler as well as a resin or hardener) are introduced via the fill pipes 76, 77 into the premixer 70. If needed, the flowable mass itself naturally also may added to the premixer 70. The added starting components are mixed with each other by means of the mixing elements 721, 722, and 723 moved by the drive shaft 72 and form the flowable mass 5, are guided via the outlet opening 74 into the partial container 4, whereby the fluid levels 10 and 75 are formed.

Thanks to the heating and cooling device 9 the mass 5 fed into the partial container 4 is kept at a temperature where it has a relatively low viscosity and flows well. After drive 13 is turned on, the shaft 12, and thus also the agitating elements 8 and 21 and the strip-off elements, for example 17, 18, are rotated around the container axis 2. The agitating elements 8 now homogenize the mass 5 to be degassed by constant agitation. The pipe section 11 conducting the shaft 12 is hereby always located above level 10 of the flowable mass 5 to be degassed. This ensures that the bearing positioning the shaft 12 in the pipe section 11 is removed from contact with the possibly chemically aggressive mass 5.

As soon as the inlet opening 73 of the pass-through mixer 70 is below fluid level 10 as a result of the rising share of mass 5, flowable mass 5 is aspirated from the partial container 4 through the inlet opening 73 that is located in the intake area of mixing element 723. This means that aspirated, flowable mass and the flowable mass produced by means of the mixing elements 721 and 722 meet in the intake area of mixing element 723. These masses are fed via the deflection elements that improve the mixing to mixing element 723 and are mixed with each other. The resulting flowable mass is ejected through outlet opening 74 as a free jet into the flowable mass inside partial container 4 and mixes intensively with this mass. Since, as a result of the jet formation, this mixing is associated with an intensive circulation of the material, the flowable mass is simultaneously degassed to a very high degree. The mixing and pre-degassing is greatly improved by a constant movement of the flowable mass 5 inside the partial container 4 that is effected by the agitation elements 8. It is advantageous that the outlet opening 74 is constructed in an adjustable or controllable manner. This makes it possible to change the intensity of the free jet entering the surrounding mass 5. In this way, the degree of mixing and the pre-degassing intensity can be substantially influenced.

If, after at least one batch of starting components has been added to the mixing device, the flowable mass 5 present in the partial container 4 exceeds a predefined value that can be determined, for example, by measuring the level, it can be safely assumed that the composition of the mass is stoichiometrically correct and can be directly processed further, for example, in a casting apparatus.

Degassing that is especially good for certain applications with simultaneous intensive mixing of the mass 5 is achieved if the mass is not added directly to an apparatus for further processing but is further processed in the thin layer degassing device integrated into the container 1. It would then be advantageous that the pass-through container 6 and possibly also the pass-through mixer 70 and the container have been evacuated.

The flowable mass 5 is passed in this case through the controllable opening 14 into the pass-through container 6. If the same pressure is present both above and below the dividing wall 3, for example a vacuum, the mass is moved by force of gravity. If a vacuum is present in the pass-through container and a higher, for example, atmospheric pressure is present in the storage container (vacuum-tight bearing), the mass is additionally pressed into the pass-through container 6 as a result of the difference in pressure. The mass 5 exiting the opening 14 impacts the run-off surface 15 not far from the shaft 12. The temperature of the mass, and accordingly also the temperature of the inside of the pass-through container 6, have been adjusted so that the mass 5 flows from the inside to the outside in the form of thin layers over the run-off surface 15. During the run-off to the outside, the layers vary in thickness, which results in a natural circulation of the layers and thus improves the mixing. At the same time, the mass to be degassed is distributed over the entire run-off surface as it flows off. The stripping element 17 that is rotated by the shaft 12 ensures that on the hand an evenly thin layer of degassed mass is formed by smoothing, and that on the other hand the swirling of the mass and its shear rate is drastically improved by the stripping-off and the tangential movement. This additionally forces the degassing and, at the same time, the mixing.

As soon as the thin mass layer has reached the outer edge or the slits of the run-off surface 15 located in the area of the outer edge, the mass leaves this run-off surface and flows via the edge or through the slits to the run-off surface 16 below, where it is then guided under the force of gravity from outside to the inside and is smoothed and mixed by the strip-off element 18 as on the metal sheet above it. Since the mass in this way runs successively through all run-off surfaces, an extremely powerful degassing of the mass 5 is achieved with permanent mixing in a tight space.

It is advantageous that the strip-off elements 17, 18 are constructed axially adjustable, since this makes it possible to very conveniently change the spacing between run-off surface and associated stripping element, i.e. set a predetermined layer thickness.

The degassed, homogenized mass 20 is collected in the buffer space 19 and agitated with the agitating elements 21, primarily in the bottom area of the buffer space 19, to effectively prevent it from sedimenting. The mass 20 can be fed via outlet pipe section 22 to a casting apparatus, if needed.

Instead of a single pass-through mixer 70, two or more pass-through mixers (shown with broken lines in the drawing) can be integrated into inlet 7 of container 1. This makes it possible to substantially increase the throughput through the mixing device. An especially quick yet simultaneously homogeneous mixing along with a good pre-degassing of the mass 5 is achieved if the inlet is formed by openings 80 in the wall of the container 1, said openings being evenly distributed in a circle around shaft 12.

What is claimed is:

1. An apparatus for producing a flowable mass, comprising:
   a first container for receiving the flowable mass;
   agitation elements for mixing the flowable mass, the agitation elements being arranged below of a level of the flowable mass in the first container;
   an outlet for the flowable mass;
   a pass-through mixer arranged in an inlet of the first container;
   wherein the pass-through mixer comprises mixing elements and a pre-mixing container, the pre-mixing container including at least one fill pipe for adding starting components of the flowable mass, the pre-mixing container having an inlet and outlet for the flowable mass arranged below the level of the flowable mass in the first container.

2. The apparatus of claim 1, wherein the inlet of the pre-mixing container is located in a vacuum range of one of the mixing elements.

3. The apparatus of claim 2, wherein the pre-mixing container is constructed in tubular shape.

4. The apparatus of claim 3, wherein at least a first of the mixing elements is arranged between the at least one fill pipe and the inlet of the pre-mixing container, and at least a second of the mixing elements is axially offset from the first of the mixing elements and arranged between the inlet and outlet of the pre-mixing container.

5. The apparatus of claim 1, wherein the outlet of the pre-mixing container is constructed so as to be adjustable or controllable.

6. The apparatus of claim 1, wherein the pass-through mixer and the first container are constructed in an evacuatable manner.

7. The apparatus of claim 1, wherein the flowable mass is stored in an upper partial container of the first container, and that the first container is provided with a degassing system located under the upper partial container, the degassing system holding flowable mass from the upper partial container.

8. The apparatus of claim 7, wherein the first container is constructed essentially in a cylinder-symmetrical manner and has a shaft extending essentially vertically along the cylinder axis and holding the agitation elements, as well as a lower space for storing a degassed mass, and a pass-through container located between the upper partial container and the lower space, wherein the pass-through container is provided with a thin layer degassing system.

9. The apparatus of claim 8, wherein the inlet of the first container is formed by openings in a wall of the first container, the openings being evenly distributed in a circle around the shaft.

10. The apparatus of claim 1, comprising at least two pass-through mixers disposed in the inlet of the first container.

* * * * *